Figure 1:
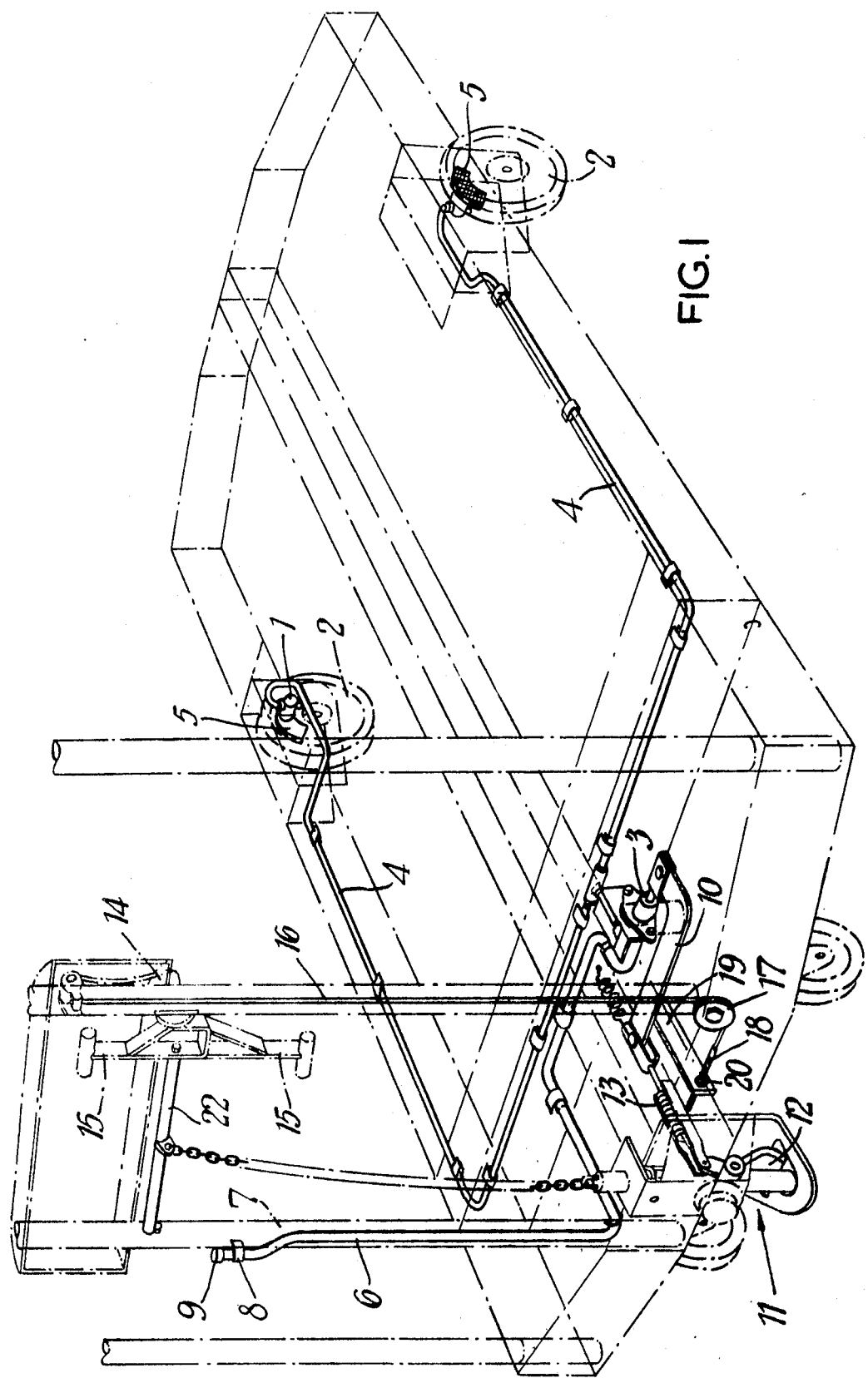

United States Patent
Holland

[15] 3,664,465
[45] May 23, 1972

[54] TROLLEYS

[72] Inventor: Gordon Christopher Yardley Holland, London, England

[73] Assignee: Lansing Bagnall Limited, Basingstoke, Hampshire, England

[22] Filed: Feb. 24, 1970

[21] Appl. No.: 13,384

[30] Foreign Application Priority Data

Feb. 24, 1969  Great Britain..........................9,853/69

[52] U.S. Cl..............................188/10, 188/106 P, 188/112, 280/47.34
[51] Int. Cl...........................................................B62c 5/04
[58] Field of Search....................................188/9, 10, 19–22, 188/105, 106 R, 106 P, 112, 119, 142, 344, 352, 2 R, 3 H; 280/47.34; 303/13

[56] References Cited

UNITED STATES PATENTS

| 1,987,435 | 1/1935 | Engel | 303/13 UX |
|---|---|---|---|
| 2,085,869 | 7/1937 | Ross | 188/3 H |
| 2,149,188 | 2/1939 | Shaffer | 188/112 |
| 2,322,499 | 6/1943 | Andrews | 188/106 |
| 2,755,629 | 7/1956 | Baisch | 188/352 X |
| 2,777,293 | 1/1957 | Hawkins | 188/352 X |
| 2,792,083 | 5/1957 | Bourque et al. | 188/106 |
| 3,005,640 | 10/1961 | Cole | 280/47.34 |

*Primary Examiner*—Duane A. Reger
*Attorney*—Sommers & Young

[57] ABSTRACT

A wheeled trolley provided with an hydraulic braking system for the wheels thereof. The hydraulic braking system according to one aspect has a reservoir comprising a vertically extending tube of uniform cross section and according to another aspect has a single master piston and cylinder arranged to be actuated by any one of an over-run device, a squeeze-grip device and a hand-lever device.

3 Claims, 2 Drawing Figures

TROLLEYS

This invention relates to wheeled trolleys and more particularly of the kind adapted to be interconnected to form a train for towing by a tractor or other towing device.

According to one aspect of this invention, a trolley of the kind described is provided with an hydraulic braking system for the wheels thereof, the hydraulic braking system having a single master piston and cylinder arranged to be actuated by any one of an over-run device, a squeeze-grip device and a hand-lever device. The braking system can be normally "on" or normally "off" as desired.

According to another aspect of this invention, a wheeled trolley is provided with an hydraulic braking system and the reservoir for hydraulic fluid comprises a vertically extending tube of substantially uniform cross section. The tube may have an internal diameter such that for a given viscosity of braking fluid capillary action inhibits leakage when the trolley is inverted for maintenance purposes.

The tubing of the system is preferably flexible tubing, pressures being kept within safe limits by a shock-spring between the over-run device and the master piston and cylinder.

Figure 2:
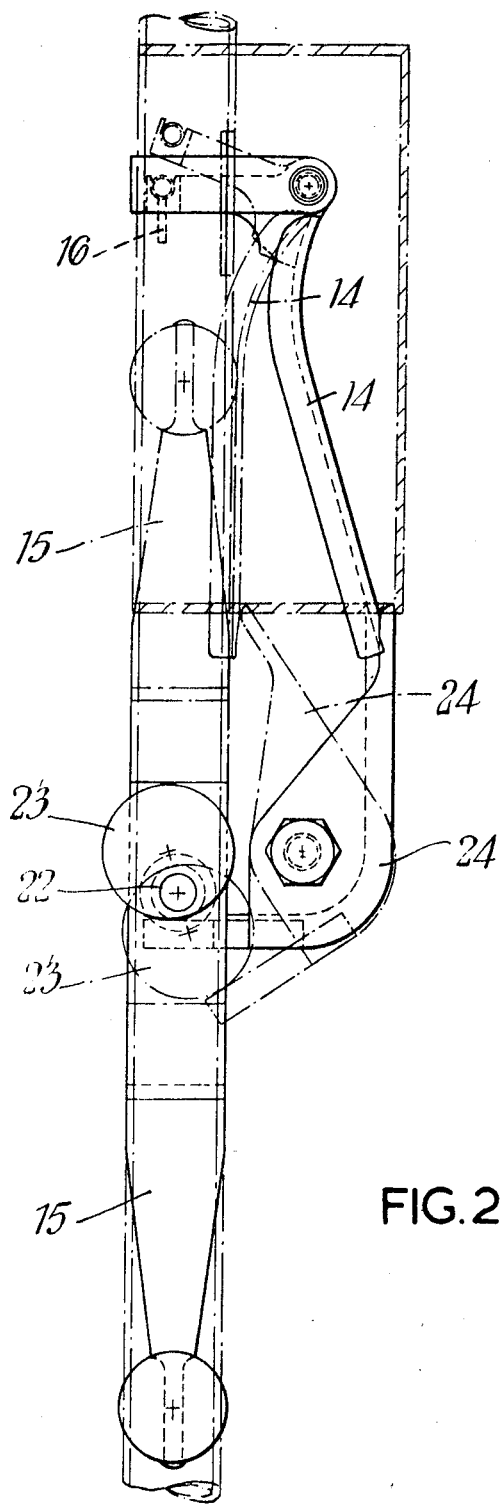

In the accompanying drawing, one example of trolley construction in accordance with the invention, is illustrated somewhat diagrammatically. In the drawing:

FIG. 1 shows a perspective view of the trolley, and
FIG. 2 shows the arrangement of the squeeze-grip and hand-lever.

Referring to FIG. 1 of the drawing, this shows in full line, the hydraulic braking system for the rear wheels, other parts of the trolley being shown in chain-dotted line. The system shown causes the brakes to be normally "off."

The hydraulic circuit between the single-acting slave cylinders 1 at the rear wheels 2 and the master cylinder 3 disposed adjacent the front end of the trolley is through nylon tubing 4. The slave cylinders 1 actuate brake pads 5 which are mounted directly on the pistons of the slave cylinders and engage directly on the inside surfaces of the wheel webs or on shields attached to the parts of thrust bearings rotating with the wheels so that these bearings take the braking thrust. The reservoir and filler tube for the hydraulic fluid are combined in a single nylon tube 6 which extends from the master cylinder 3 up one of the trolley corner posts 7 to which it is fastened by clips 8. The cap 9 of the tube 6 is provided with an air relief hole. For a given viscosity of hydraulic fluid, the cross section of the tube 6 can be chosen to provide a capillary action which inhibits fluid from spilling when for example the trolley is tipped over during servicing.

The piston of the master cylinder 3 is operated through a linkage which includes a bell-crank lever 10. Connected to this bell-crank lever 10 are three forms of actuating device. One is the over-run device associated with the pin coupling 11 at the front end of the trolley for connecting to the trolley ahead of it in a train. Upon over-run of the trolley occurring, the coupling part from the trolley ahead strikes a deflector plate 12 which, through a linkage including a shock-spring clevis 13, connects with the bell-crank lever 10. The shock-spring clevis 13 absorbs shock impulses which would otherwise be transmitted into the hydraulic circuit. The second and third actuating devices are both manually operated and comprise the squeeze-grip brake lever device 14 and a hand-lever operated parking device 15. Both of these operate on the bell-crank lever 10 through a common nylon cord 16 or stretched steel cable which runs around nylon pulley 17. At its lower end the nylon cord is fixed to threaded rod 18 which passes through one end of an arm 19 and is clamped thereto by nuts 20, the arm 19 at its other end being fixed to the bell-crank lever 10. The clamping arrangement of the rod 18 permits brake adjustment.

Referring to FIG. 2, the squeeze-grip device 14, when squeezed, pivots clockwise about point 21 to apply the brake. The hand-lever device 15 is shown in its "off" position in full line and in its "on" position in chain-dotted line and is mounted to the trolley frame through cross-shaft 22. Mounted on the hand-lever is an eccentric 23, which when the hand-lever is moved to the "on" position, displaces lever 25 which in turn rotates the squeeze-grip device 14 clockwise to apply the brake.

The braking system described can conveniently be used as a conversion kit to replace a rod or cable operated braking system of existing trolleys.

I claim:

1. A wheeled trolley having an hydraulic braking system comprising:
   a. a single master piston and cylinder operating the braking system;
   b. a pivotally mounted bell-crank lever one arm of which is connected to said piston of said master piston and cylinder;
   c. a coupling at the front end of the trolley;
   d. a movable deflector plate associated with said coupling;
   e. a mechanical linkage, including a shock-absorbing spring, connected between said movable deflector plate and the other arm of said bell-crank lever;
   f. a pivotally mounted squeeze-grip lever;
   g. a flexible element connected between said squeeze-grip lever and said other arm of said bell-crank lever;
   h. a pivotally mounted hand lever;
   i. a pivotally mounted two-arm lever;
   j. a part on said hand lever which engages said one arm of said two-arm lever;
   k. said other arm of said two-arm lever being engageable with said squeeze-grip lever to pivot said squeeze-grip lever.

2. A wheeled trolley according to claim 1 wherein a reservoir for hydraulic fluid for the hydraulic system comprises a vertically extending tube of substantially uniform cross section, the internal diameter of said tube being such, in relation to the viscosity of the hydraulic fluid, that capillary action inhibits leakage of the hydraulic fluid from said tube should the tube be displaced from the vertical position.

3. A wheeled trolley according to claim 1 wherein a brake pad is operatively associated with each braked wheel of said trolley and is directly connected to the piston of a slave piston and cylinder and said cylinder of said slave piston and cylinder is connected to the master cylinder.

* * * * *